(12) United States Patent
Roberge et al.

(10) Patent No.: US 9,801,333 B2
(45) Date of Patent: Oct. 31, 2017

(54) OPTIMIZING PRODUCT FLOW IN A DROP CHUTE BY CONTROLLING THE SHAPE AND POSITION OF VORTICES PRESENT IN THE SYSTEM

(71) Applicant: CNH Industrial Canada, Ltd., Saskatoon (CA)

(72) Inventors: Martin J. Roberge, Saskatoon (CA); Ryan C. Roberge, Ponteix (CA); Stewart J. Millie, Saskatoon (CA); Ethan C. S. Bent, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/608,005

(22) Filed: May 30, 2017

(65) Prior Publication Data

US 2017/0258004 A1    Sep. 14, 2017

Related U.S. Application Data

(62) Division of application No. 14/306,724, filed on Jun. 17, 2014, now Pat. No. 9,686,903.

(51) Int. Cl.
*B65G 53/08* (2006.01)
*A01C 7/20* (2006.01)
*B65G 11/06* (2006.01)
*A01C 7/08* (2006.01)
*B65G 29/02* (2006.01)

(52) U.S. Cl.
CPC .............. *A01C 7/206* (2013.01); *A01C 7/084* (2013.01); *B65G 11/066* (2013.01); *B65G 29/02* (2013.01)

(58) Field of Classification Search
CPC ............. B65B 53/08; A01C 7/082; B60P 1/60
USPC ................... 406/52, 127, 130, 144, 181, 183
See application file for complete search history.

(56) References Cited

U.S. PATENT DOCUMENTS

| | | | | |
|---|---|---|---|---|
| 3,860,146 | A * | 1/1975 | Bauman | A01C 7/044 221/168 |
| 3,885,769 | A * | 5/1975 | Morrison | F16K 7/07 222/504 |
| 3,888,387 | A * | 6/1975 | Deckler | A01C 7/04 111/185 |
| 4,009,912 | A * | 3/1977 | Mraz | B65G 53/14 406/11 |

(Continued)

*Primary Examiner* — Joseph Dillon, Jr.
(74) *Attorney, Agent, or Firm* — Rebecca L. Henkel; Rickard K. DeMille

(57) ABSTRACT

An air cart has a drop chute for conveying an agricultural product such as seed, from a metering device to a venturi portion of a product conveyance tube. The drop chute has a contoured downstream sidewall resulting in changes in drop chute width which introduce vortices providing an enhanced product flow. The downstream sidewall has an inward sloping region reducing the drop chute width beginning closely adjacent the metering device and continuing down about one-third the way from the metering device to the conveyance tube, and an abrupt corner causing an increase in drop chute width near the product conveyance tube followed by a curved region creating a gradual further increase in width terminating adjacent to the product delivery tube. A large low speed vortex is created near the inward sloping region and a small strong vortex is created adjacent the curved region.

5 Claims, 4 Drawing Sheets

(56) References Cited

U.S. PATENT DOCUMENTS

| | | | | |
|---|---|---|---|---|
| 4,010,097 A * | 3/1977 | Murray | B07B 4/02 | 209/139.1 |
| 4,169,419 A * | 10/1979 | Burgess | A01C 15/001 | 111/100 |
| 4,176,798 A * | 12/1979 | Talbott | B02C 19/06 | 241/39 |
| 4,296,695 A * | 10/1981 | Quanbeck | A01C 7/081 | 111/136 |
| 4,681,484 A * | 7/1987 | Egger | B65G 53/32 | 222/217 |
| 5,826,523 A * | 10/1998 | Gregor | A01C 7/081 | 111/181 |
| 5,863,314 A * | 1/1999 | Morando | B01F 3/04248 | 266/228 |
| 6,155,751 A * | 12/2000 | Lane | B65G 53/08 | 406/108 |
| 6,619,272 B2 * | 9/2003 | Jones | B60K 15/077 | 123/509 |
| 7,082,955 B2 * | 8/2006 | Lane | B65G 53/48 | 137/14 |
| 7,182,029 B2 * | 2/2007 | Johnson | A01C 7/081 | 111/175 |
| 7,854,206 B2 * | 12/2010 | Horsch | A01C 7/046 | 111/185 |
| 8,096,451 B2 * | 1/2012 | Monti | B65B 1/36 | 222/452 |
| 8,820,218 B2 * | 9/2014 | Fischer | A47J 31/401 | 99/323.1 |
| 2003/0012658 A1 * | 1/2003 | Haiun | F04F 5/461 | 417/163 |
| 2003/0086469 A1 * | 5/2003 | Stercho | F27B 3/183 | 373/79 |
| 2006/0243760 A1 * | 11/2006 | McIntosh | B22D 41/50 | 222/606 |
| 2008/0038131 A1 * | 2/2008 | Lenhart | F04B 7/0007 | 417/519 |
| 2008/0175675 A1 * | 7/2008 | Wood | B65G 53/08 | 406/61 |
| 2008/0260560 A1 * | 10/2008 | Lenhart | F04B 15/02 | 417/516 |
| 2012/0298024 A1 * | 11/2012 | Naylor | A01C 7/081 | 111/175 |

* cited by examiner

OPTIMIZING PRODUCT FLOW IN A DROP CHUTE BY CONTROLLING THE SHAPE AND POSITION OF VORTICES PRESENT IN THE SYSTEM

CROSS REFERENCE TO RELATED APPLICATIONS

This is a divisional patent application based on U.S. patent application Ser. No. 14/306,724, filed Jun. 17, 2014, entitled "OPTIMIZING PRODUCT FLOW IN A DROP CHUTE BY CONTROLLING THE SHAPE AND POSITION OF VORTICES PRESENT IN THE SYSTEM", which is hereby incorporated by referenced in its entirety.

BACKGROUND OF THE INVENTION

1. Field of the Invention

The present invention relates to farm implements and, more particularly, to an agricultural product meter box for supplying metered quantities of product such as seed, fertilizer, herbicide or insecticide to an air stream.

2. Description of the Related Art

Air seeder systems include a traction unit with an air cart in tow and frequently include a third unit such as a planter or cultivator either intermediate the traction unit and air cart or towed behind the air cart. Agricultural implements that employ an air seeder system to apply seed, fertilizer, or other particulate matter to the surface of a farm field typically have a material supply source such as one or more central hoppers or tanks that are loaded with the particulate matter. The hoppers have or are associated with a metering device, which is typically a rotating element, that meters the particulate matter from the hoppers into a set of distribution channels, such as conduits, hoses, etc., that are flow coupled to the individual row units, or seed boxes associated with the individual row units. In many implementations, a pneumatic source such as a blower system provides a turbulent air stream into which the particulate matter is entrained to pass the particulate matter through the distribution channels and ultimately to the individual row units.

In some air seeder systems, agricultural product from the hopper passes through the metering device and then down a drop chute to a venturi region of one or more product conveyance tubes. Some drop chute designs are inadequate for all products, especially small products like canola seeds, to be efficiently delivered from the roller of the meter located above the drop chute due to unstable and uncontrolled vortices.

What is needed in the art is a drop chute capable of efficiently delivering a wide variety of agricultural products.

SUMMARY OF THE INVENTION

The present invention provides a drop chute having a contoured sidewall for enhanced product flow.

The invention in one form is directed to a pneumatic agricultural product delivery system having at least one product supply hopper, a pneumatic source and at least one product conveyance tube receiving air flow from the pneumatic source for supplying air entrained product to a utilization implement. A metering device supplies product from the supply hopper to a product conveyance tube by way of an elongated drop chute of generally rectangular cross-sectional configuration. The drop chute has a front wall, a rear wall, and first and second sidewalls extending downwardly from the metering device to the product conveyance tube. The drop chute cross-sectional configuration has a varying width between the first and second sidewalls beginning near the metering device and diminishing to an intermediate lesser width which continues downwardly to an abrupt increase in width near the product conveyance tube. The abrupt increase is followed by a gradual further increase in width terminating adjacent the product delivery tube.

The invention in another form is directed to an air cart having a pneumatic source for supplying a flow of air entrained agricultural product from a product hopper to be applied by a utilization implement to an agricultural field. There is a metering device for supplying product from the hopper to a product conveyance tube and an elongated drop chute of generally rectangular cross-sectional configuration having a front wall, a rear wall, and first and second sidewalls extending downwardly from the metering device to the product conveyance tube. The drop chute cross-sectional configuration has a varying width between the first and second sidewalls beginning near the metering device and diminishing to an intermediate lesser width which continues downwardly to an abrupt increase in width near the product conveyance tube, the abrupt increase followed by a gradual further increase in width terminating adjacent the product delivery tube.

In a further form the invention is directed to an air cart having a pneumatic source for supplying a flow of air entrained agricultural product downstream in a conveyance tube from a product hopper to be applied by a utilization implement to an agricultural field includes a metering device for supplying product from the hopper to the product conveyance tube, and an elongated drop chute of a variable generally rectangular cross-sectional configuration having a front wall, a rear wall, an upstream sidewall and a downstream sidewall extending downwardly from the metering device to the product conveyance tube. The rear wall and upstream sidewall remain essentially flat from the metering device to the product conveyance tube. The downstream sidewall has an inward sloping region reducing the drop chute width beginning closely adjacent the metering device and continuing down about one-third the way from the metering device to the conveyance tube and an abrupt corner causing an increase in drop chute width near the product conveyance tube followed by a curved region creating a gradual further increase in width terminating adjacent the product delivery tube.

An advantage of the present invention is the capability of adequately handling a wide variety of product particle sizes.

Another advantage is reduced cost due to a reduction in the amount of material used in the drop chute zone of the meter box.

Yet another advantage is a reduction in the size of the selection gates associated with the upper and lower product selection tubes. A reduced surface area equates to a lower applied force from air pressure and an associated reduction in the size and cost of hardware required to actuate them.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention, in one form, and such exemplification is not to be construed as limiting the scope of the invention in any manner.

DETAILED DESCRIPTION OF THE INVENTION

Figure 1:
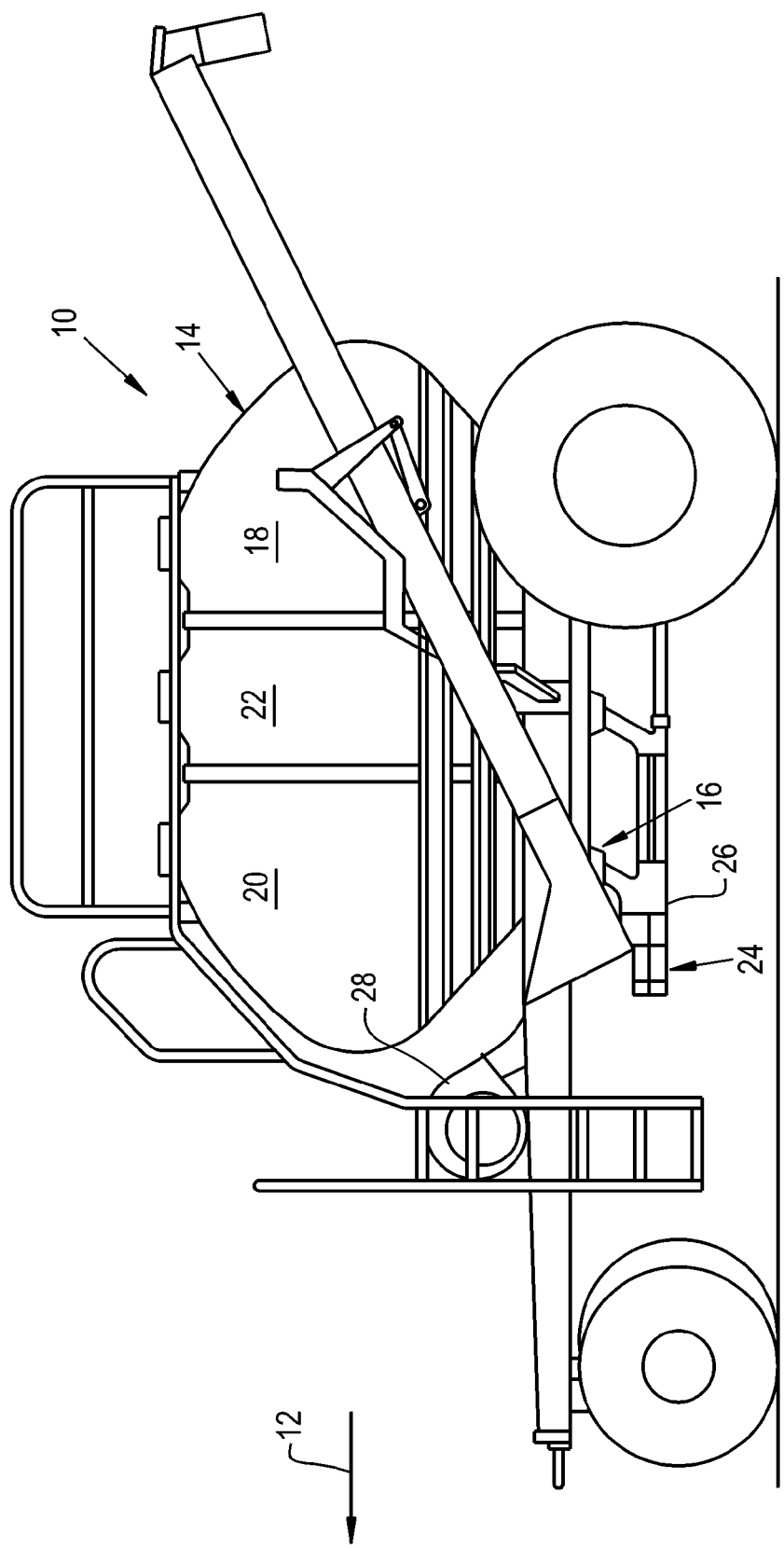
FIG. 1 is a side view of cart which may form part of an air seeder system and may include a metering box drop chute of the present invention.

Referring now to the drawings, and more particularly to FIG. 1, there is shown an air cart comprising a portion of a pneumatic agricultural product delivery system which generally includes a traction unit (not shown) for towing air cart 10 in the direction of arrow 12. The system usually includes as a third unit, a utilization implement such as an air drill (not shown) for a seeding, cultivating and/or fertilizing operation. Air carts can be tow-between or tow-behind. A tow-between cart has the advantage of the drill being the last implement over the field and does not leave prints behind. A tow-behind cart has the advantage of the drill being closer to the tractor for improved viewing of the seeding operation. As is known in the art, the air cart 10 has a large hopper 14 that holds a quantity of particulate matter, e.g., seed and/or fertilizer, and a metering unit 16 that meters the particulate matter from the tank or hopper 14 to the air drill. The hopper 14 may comprise a single compartment or several compartments, such as 18, 20, and 22. Multiple compartments provide the option of performing multiple operations, e.g., seeding and fertilizer application in a single pass. In addition to being mechanically linked with the air drill, the air cart 10 and the air drill are interconnected by air/product hoses such as the distribution lines 24. Air is supplied to the hoses via a manifold 26 or venturis by a pneumatic source such as a blower assembly 28 sometimes mounted adjacent the front of the hopper 14 and near the metering unit 16. Alternately, the blower assembly 28 may be mounted rearward of the hopper or adjacent a side of the hopper. As known in the art, the blower creates a turbulent air flow that forces the particulate matter metered by metering unit 16 into and along air/product hose 24 to the utilization implement for applying the air entrained product to an agricultural field. A drop chute couples the metering device and one or more product conveyance tubes. The prior art drop chutes are typically short and generally have a rectangular cross-sectional area for the majority of the height of the drop chute for both upper and lower product conveyance tubes.

Figure 2:
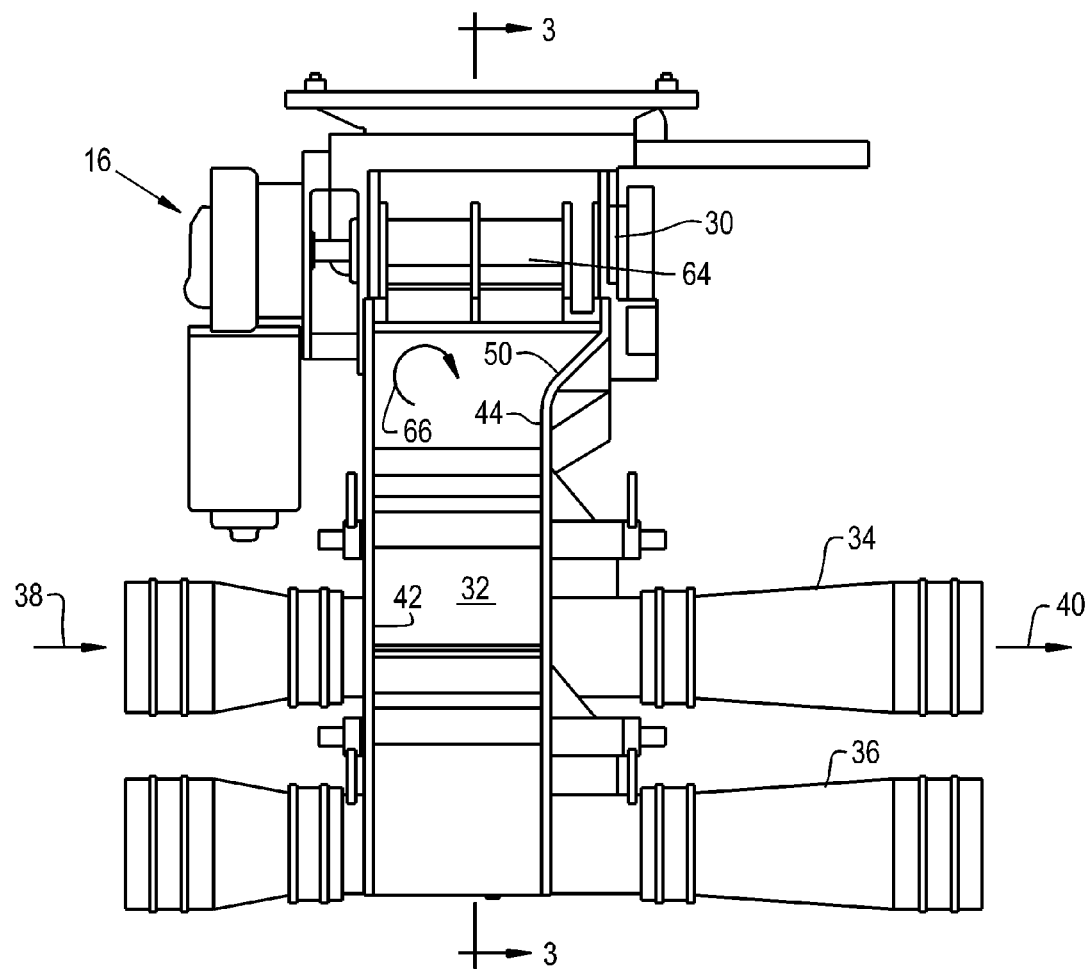
FIG. 2 is a cross-sectional view of a metering box having a metering device, drop chute and product conveyance tubes according to the invention as viewed from the rear wall of the metering box.
Figure 3:
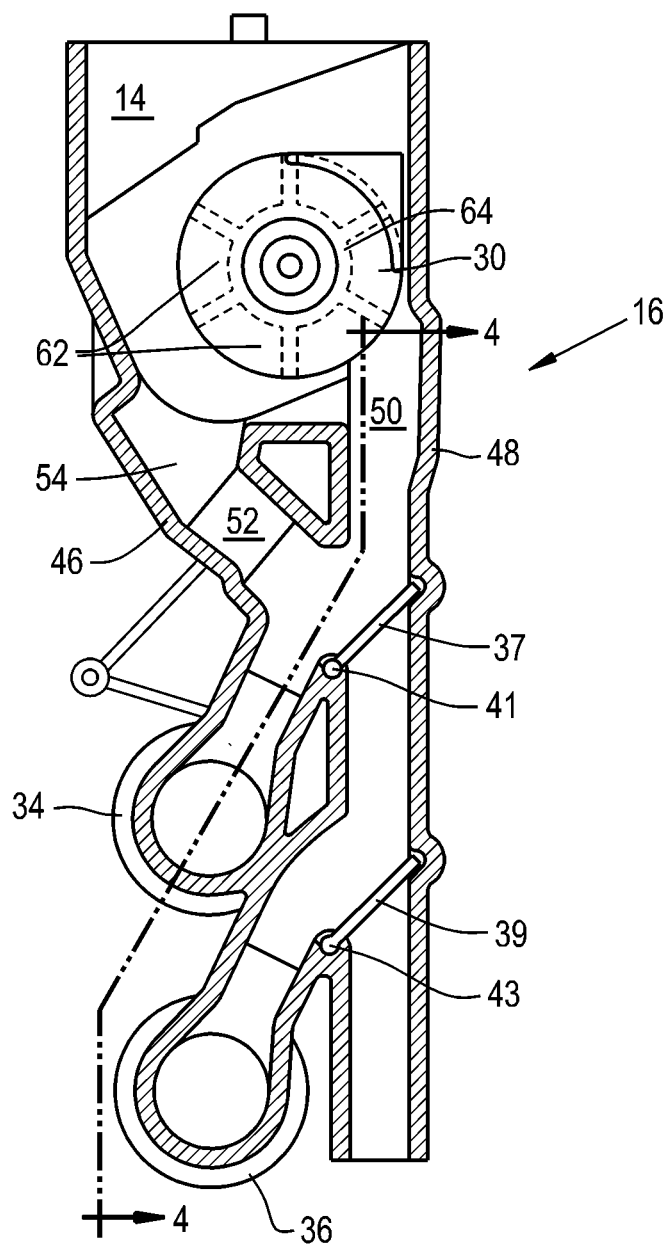
FIG. 3 is a cross-sectional view along lines 3-3 of FIG. 2.

FIG. 2 illustrates the metering box 16 comprising a metering device 30, drop chute 32 and product conveyance tubes 34, and 36 in cross-section as viewed from a rear wall of the drop chute. FIG. 3 is a cross-sectional view along lines 3-3 of FIGS. 2 and 4. FIG. 3 shows the selection gates 37 and 39 in their inclined positions so that product is delivered to the upper conveyance tube 34. Both gates are shown in approximately a 2 o'clock position and either can be pivoted counter-clockwise about its respective pivot point 41 or 43 to a 12 o'clock position. The upper gate 37 can be pivoted further counter-clockwise to a 10 o'clock position to completely close off conveyance tube 34. Air flow from a pneumatic source such as the blower assembly 28 is shown by arrow 38 entering the metering box via conveyance tube 34 while arrow 40 indicates an exiting air entrained flow of particulate matter. Drop chute 32 is formed by an upstream sidewall 42, a downstream sidewall 44, and front and rear walls 46 and 48 (FIG. 3). There is an inwardly sloping region 50 which functions to reduce the drop chute width beginning closely adjacent the metering device 30 as shown by W1 in FIG. 4 and continuing downwardly about one-third the way from the metering device to the conveyance tube 34 as shown at W2. Thereafter, the width remains essentially constant down to W3. The slope functions to funnel product to the mid position of the meter box. As seen in FIG. 3, a similar slope 52 is applied to the downstream side of the drain chute 54 to facilitate product drainage.

Figure 4:
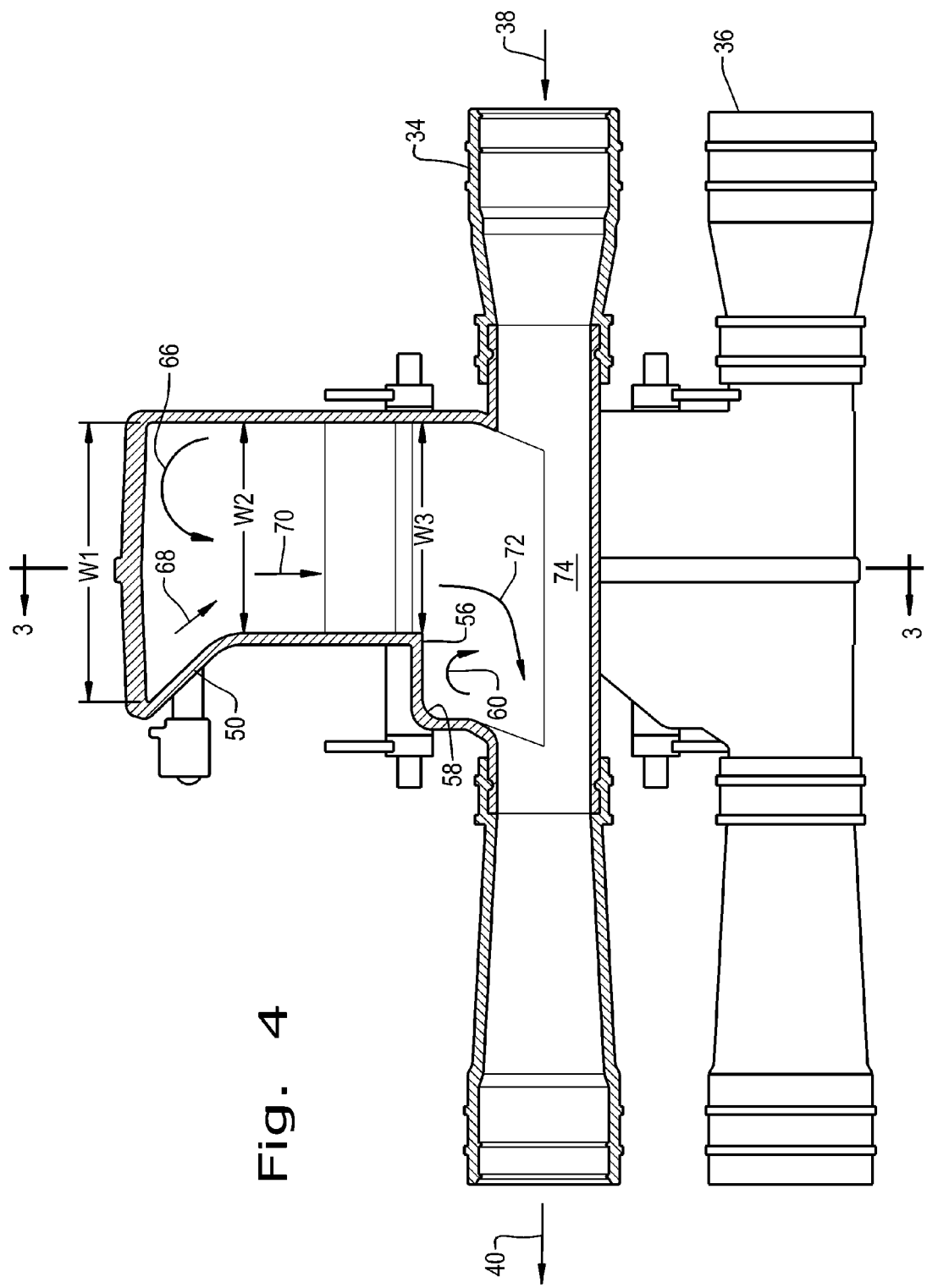
FIG. 4 is a partial cross-sectional view along lines 4-4 of FIG. 3.

FIG. 4 is a cross-sectional view along lines 4-4 of FIG. 3 and shows the abrupt corner 56 which creates an increase in drop chute width near the product conveyance tube followed by a curved or arcuate region 58 creating a gradual further increase in width terminating adjacent to the product delivery tube. The corner and curved region create the small strong vortex 60 which accelerates product flow in a circular motion. The curved region 58 has a radius of curvature about half the diameter of the product conveyance tube.

In operation, product such as seed in hopper 14 is conveyed by wedge-shaped pockets 62 in the meter roller 64 to the drop chute near the slope 50 and flows along the downstream side of the large vortex 66 as indicated by arrows 68 and 70. This large, slow-moving, weak vortex 66 in the main drop chute rotates clockwise as viewed looking through the vertical rear wall 48 as in FIG. 2 and counter-clockwise as viewed from the front wall as in FIG. 4. The vortex 66 allows large and small product to fall naturally without having a significant upwards force upon it. Product continues downward as shown by arrow 72 to near the abrupt corner 56 where the small high speed clockwise vortex 60 serves to entrain product exiting the drop chute and accelerate it in a circular motion, changing the product's trajectory from vertically downwards to horizontal as it is propelled via airflow through the venturi portion 74 of the product conveyance tube 34. A weak vortex may be present in the drain chute zone which has a minimal impact on the overall product flow with the downstream sidewall geometry. To obtain optimal product flow conditions and rates there should be a minimal (near zero) pressure differential between the area above the entire meter box (in the hopper) and in the product conveyance tube being used. However, the pressure in the hopper should not be lower than that in the product conveyance tube.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An air cart having a pneumatic source for supplying a flow of air entrained agricultural product downstream in a product conveyance tube from a product hopper to be applied by a utilization implement to an agricultural field, including:
   a metering device for supplying product from the hopper to the product conveyance tube; and an elongated drop chute of a variable generally rectangular cross-sectional configuration having a front wall, a rear wall, an upstream sidewall and a downstream sidewall extending downwardly from the metering device to the product conveyance tube;

the rear wall and upstream sidewall remaining essentially flat from the metering device to the product conveyance tube;

the downstream sidewall having an inward sloping region reducing the drop chute width beginning closely adjacent the metering device and continuing down about one-third the way from the metering device to the conveyance tube; and an abrupt corner causing an increase in drop chute width near the product conveyance tube followed by a curved region creating a gradual further increase in width formed by an arcuate region extending downwardly and terminating adjacent to the product conveyance tube.

2. The air cart of claim 1, wherein the product conveyance tube is of a generally hollow cylindrical cross-section and the abrupt corner occurs at a distance approximately one-half the outer diameter of the product conveyance tube from the tube.

3. The air cart of claim 1, wherein the gradual further increase in area causes a small strong vortex to be formed adjacent thereto.

4. The air cart of claim 3, wherein the strong vortex accelerates product in a circular motion to facilitate the direction change from vertically downward to horizontal through the product conveyance tube.

5. The air cart of claim 1, wherein the inward sloping region induces a large low-speed vortex below the metering device in the vicinity of the sloping region and functions to funnel product toward the center of the metering device.

* * * * *